(12) United States Patent
Danielson et al.

(10) Patent No.: US 8,056,581 B2
(45) Date of Patent: Nov. 15, 2011

(54) LATCHING CONNECTORS

(75) Inventors: Robert Danielson, St. Paul, MN (US); Stanlee Meisinger, St. Paul, MN (US)

(73) Assignee: Fastest, Inc., Roseville, MN (US)

(*) Notice: Subject to any disclaimer, the term of this patent is extended or adjusted under 35 U.S.C. 154(b) by 804 days.

(21) Appl. No.: 11/398,790

(22) Filed: Apr. 6, 2006

(65) Prior Publication Data
US 2007/0235092 A1 Oct. 11, 2007

(51) Int. Cl.
*F16L 37/32* (2006.01)
(52) U.S. Cl. .......... 137/614.02; 137/614; 251/149.1; 251/149.6
(58) Field of Classification Search .......... 251/149, 251/149.1, 149.6, 149.8, 149.9; 285/276, 285/307, 316, 347; 137/614, 614.02–614.06
See application file for complete search history.

(56) References Cited

U.S. PATENT DOCUMENTS

| | | | |
|---|---|---|---|
| 2,665,928 A * | 1/1954 | Omon et al. ........... | 137/614.04 |
| 3,191,972 A | 6/1965 | Collar | |
| 3,301,272 A | 1/1967 | Pettyjohn et al. | |
| 3,417,781 A | 12/1968 | Gregg | |
| 3,530,887 A * | 9/1970 | Stratman ........... | 137/614.05 |
| 3,731,705 A | 5/1973 | Butler | |
| 3,809,122 A | 5/1974 | Berg | |
| 4,098,292 A * | 7/1978 | Evans ................. | 137/614.04 |
| 4,181,150 A | 1/1980 | Maldavs | |
| 4,221,235 A * | 9/1980 | Maldavs ............. | 137/614.04 |
| 4,222,411 A | 9/1980 | Herzan et al. | |
| 4,249,572 A * | 2/1981 | Shindelar et al. ....... | 137/614.04 |
| 4,303,098 A | 12/1981 | Shindelar | |
| 4,444,223 A * | 4/1984 | Maldavs ............. | 137/614.04 |
| 4,540,021 A | 9/1985 | Rogers | |
| 4,541,457 A | 9/1985 | Blenkush | |
| 4,546,956 A * | 10/1985 | Moberg ............... | 251/149.6 |
| 4,582,295 A | 4/1986 | Kugler et al. | |
| 4,688,830 A | 8/1987 | Meisinger et al. | |
| 4,745,948 A * | 5/1988 | Wilcox et al. ......... | 137/614.05 |
| 4,884,830 A | 12/1989 | Meisinger | |
| 4,921,282 A | 5/1990 | Meisinger | |
| 4,974,635 A * | 12/1990 | Hanus et al. ......... | 137/614.05 |
| 5,144,979 A * | 9/1992 | Shobuzako et al. ..... | 137/614.04 |
| 5,178,424 A | 1/1993 | Klinger | |

(Continued)

OTHER PUBLICATIONS

Mine Safety Appliances, ExtendAire Intermediate Pressure Accessory Kit, 2004.*

(Continued)

*Primary Examiner* — Kevin Lee
*Assistant Examiner* — Craig J Price
(74) *Attorney, Agent, or Firm* — Hamre, Schumann, Mueller & Larson, P.C.

(57) ABSTRACT

Improved latching connectors that can be used to connect a fluid system, such as manufacturing, test, or processing equipment, to an external system, for example charging, evacuation and/or testing equipment. In one embodiment, the connector includes elements by which to protect connector seals from being exposed to fluid being transferred, thereby lengthening the lifetime and reliability of the connector. In another embodiment, the male connector portion and the female connector portion are both valved in a normally closed position. The connector is designed to achieve connection of the male portion to the female portion, and sealing between the male portion and the female portion, prior to the valves in each connector portion being opened and fluid flowing through the connector. The latching connector includes a pressure locking sleeve that, once the connector is under pressure, locks the connector to prevent accidental disconnection.

9 Claims, 16 Drawing Sheets

U.S. PATENT DOCUMENTS

| | | |
|---|---|---|
| 5,316,033 A | 5/1994 | Schumacher et al. |
| 5,343,798 A | 9/1994 | Meisinger et al. |
| 5,396,927 A | 3/1995 | Marshall |
| 5,404,909 A | 4/1995 | Hanson |
| 5,507,537 A | 4/1996 | Meisinger et al. |
| 5,788,290 A | 8/1998 | Meisinger |
| 5,950,679 A | 9/1999 | Danielson et al. |
| 5,996,624 A * | 12/1999 | Ekman .................... 137/614.03 |
| 6,039,303 A | 3/2000 | Danielson et al. |
| 6,050,295 A | 4/2000 | Meisinger et al. |
| 6,073,974 A | 6/2000 | Meisinger et al. |
| 6,079,752 A | 6/2000 | Meisinger |
| 6,257,278 B1 | 7/2001 | Danielson et al. |
| 6,279,874 B1 * | 8/2001 | Nyberg ..................... 251/149.6 |
| 6,354,564 B1 * | 3/2002 | Van Scyoc et al. ........... 251/149 |
| 6,408,880 B1 | 6/2002 | Kaul |
| 6,453,945 B1 | 9/2002 | Schumacher et al. |
| 6,672,327 B1 | 1/2004 | Krywitsky |
| 6,722,628 B1 | 4/2004 | Seil |
| 6,901,947 B2 | 6/2005 | Danielson et al. |
| 2004/0244848 A1 * | 12/2004 | Maldavs ................. 137/614.04 |

OTHER PUBLICATIONS

Mine Safety Appliances, Parts List, 2009, p. 29, items 4 and 5.*

* cited by examiner

LATCHING CONNECTORS

FIELD

This application describes improved latching connectors that are used to connect a fluid system to an external system for performing processing operations, for example charging, evacuation and/or testing, on the fluid system.

BACKGROUND

Quick connect latching connectors are often used to connect a fluid system such as manufacturing, test, or processing equipment to an external system, for example charging, evacuation and/or testing equipment. Once the connection is made and any valves are opened, fluid can flow through the connector either into the fluid system or from the fluid system depending on the processing operation being performed.

In order to maximize efficiency and safety, it is important that the connector provide fast and reliable connection and reliable seals to prevent fluid leakage. In certain implementations, it is important that the seals of the connector be protected from exposure to the fluid flowing therethrough. For example, in a medical oxygen environment, exposure of the seals to oxygen can lead to deterioration of the seals and contamination of the oxygen.

In addition, in certain implementations, it is generally desirable to achieve connection of the systems and sealing of the connector prior to any fluid being allowed to flow in order to prevent fluid leakage from the connector.

SUMMARY

Improved latching connectors are described that can be used to connect a fluid system, such as manufacturing, test, or processing equipment, to an external system, for example charging, evacuation and/or testing equipment. The connectors are two-piece connectors, including a male connector portion and a female connector portion.

In one embodiment, the connector includes elements by which to protect connector seals from being exposed to fluid being transferred, thereby lengthening the lifetime and reliability of the connector. In this embodiment, the connector provides a fluid tight connection to a fluid source, for example a gas such as oxygen, and the connector includes a male connector portion and a female connector portion. The female connector portion is connected to a fluid delivery means such as a flexible tube connected to a piece of equipment or machinery. The male connector portion is connected to a fluid filler attachment, which attaches to a container, such as an oxygen tank.

In another embodiment, the male connector portion and the female connector portion are both valved in a normally closed position. The connector is designed to achieve connection of the male portion to the female portion, and sealing between the male portion and the female portion, prior to the valves in each connector portion being opened and fluid flowing through the connector. The male portion can be connected to a fluid system, for example a refrigerant loop of an air conditioning system. The female portion can be connected to an external system, for example a source of refrigerant for charging the air conditioning system, a source of low pressure for evacuating the system, or testing equipment for testing the system.

The latching connectors can include a pressure locking sleeve that, once the connector is under pressure, locks the connector to prevent accidental disconnection. The pressure must then be removed or vented from the connector before the female portion can be disconnected from the male portion. The female portion can also include a deflector that forces vented fluid away from the user during venting.

The latching connectors can also include a colored indicator that is provided on the female portion to provide visual feedback to the user to indicate whether or not proper connection has been achieved with the male portion.

In addition, the male portion and the female portion can each include colored portions. The colored portions are used to indicate, by a matching of colors, that a correct female portion is being connected to a correct male portion.

The male portion can also include a seal held within a groove created by two threaded components connected together for sealing with a poppet valve that control fluid flow through the male portion. Such a construction stably holds the seal, and facilitates replacement of the seal by disconnecting the threaded components.

BRIEF DESCRIPTION OF THE DRAWINGS

Further details are explained below with the help of the examples illustrated in the attached drawings in which.

DETAILED DESCRIPTION

Various embodiments will be described in detail with reference to the drawings, wherein like reference numbers generally indicate corresponding elements through out the several views. Reference to various embodiments does not limit the scope of the invention, which is determined only by the scope of the claims attached hereto. Additionally, any examples set forth in this specification are not intended to be limiting and merely set forth some of the many possible embodiments incorporating the inventive concepts.

Figure 1:
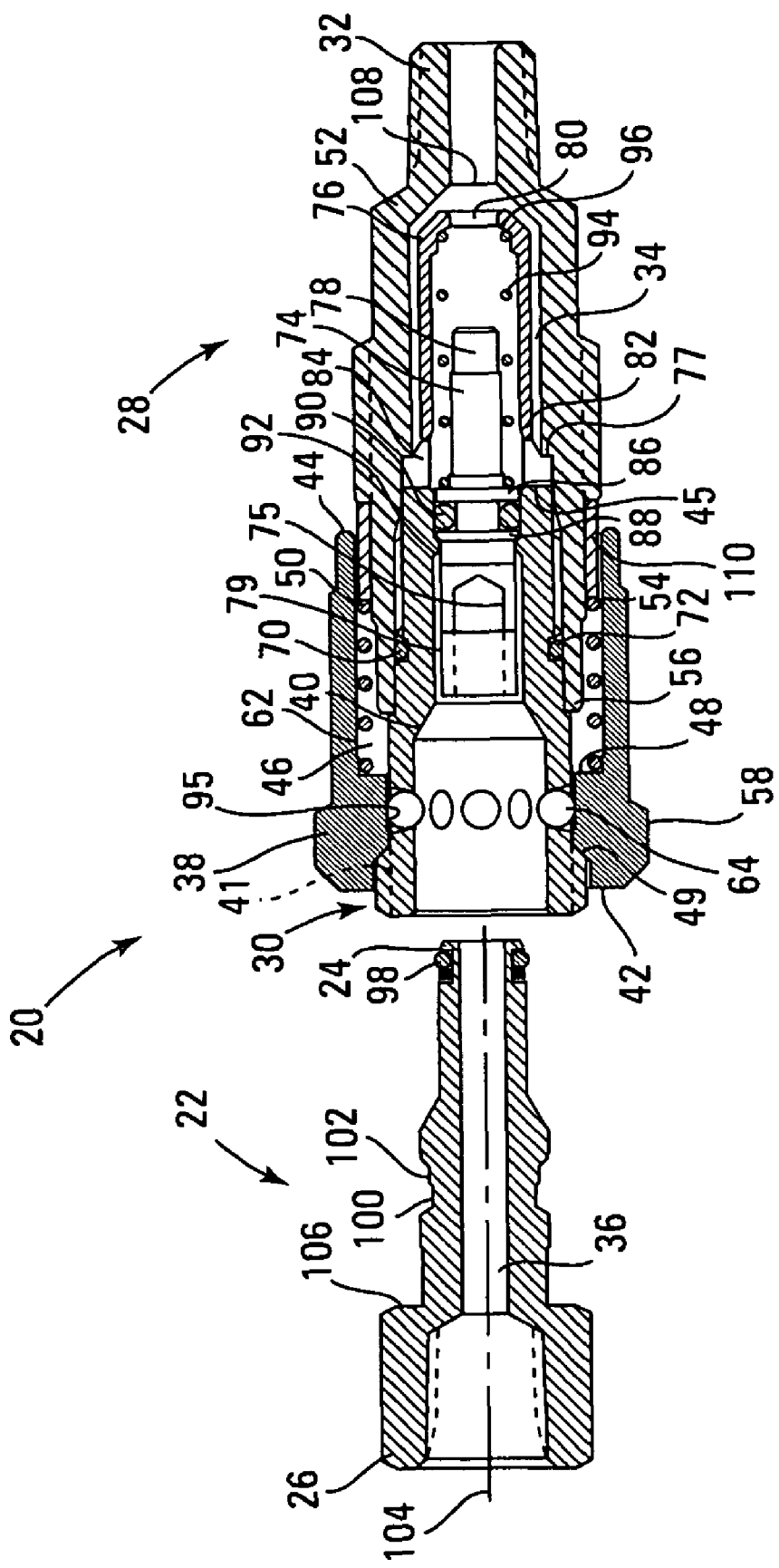
FIG. 1 is a cross-sectional view of one embodiment of a latching connector, in a disconnected position.
Figure 2:
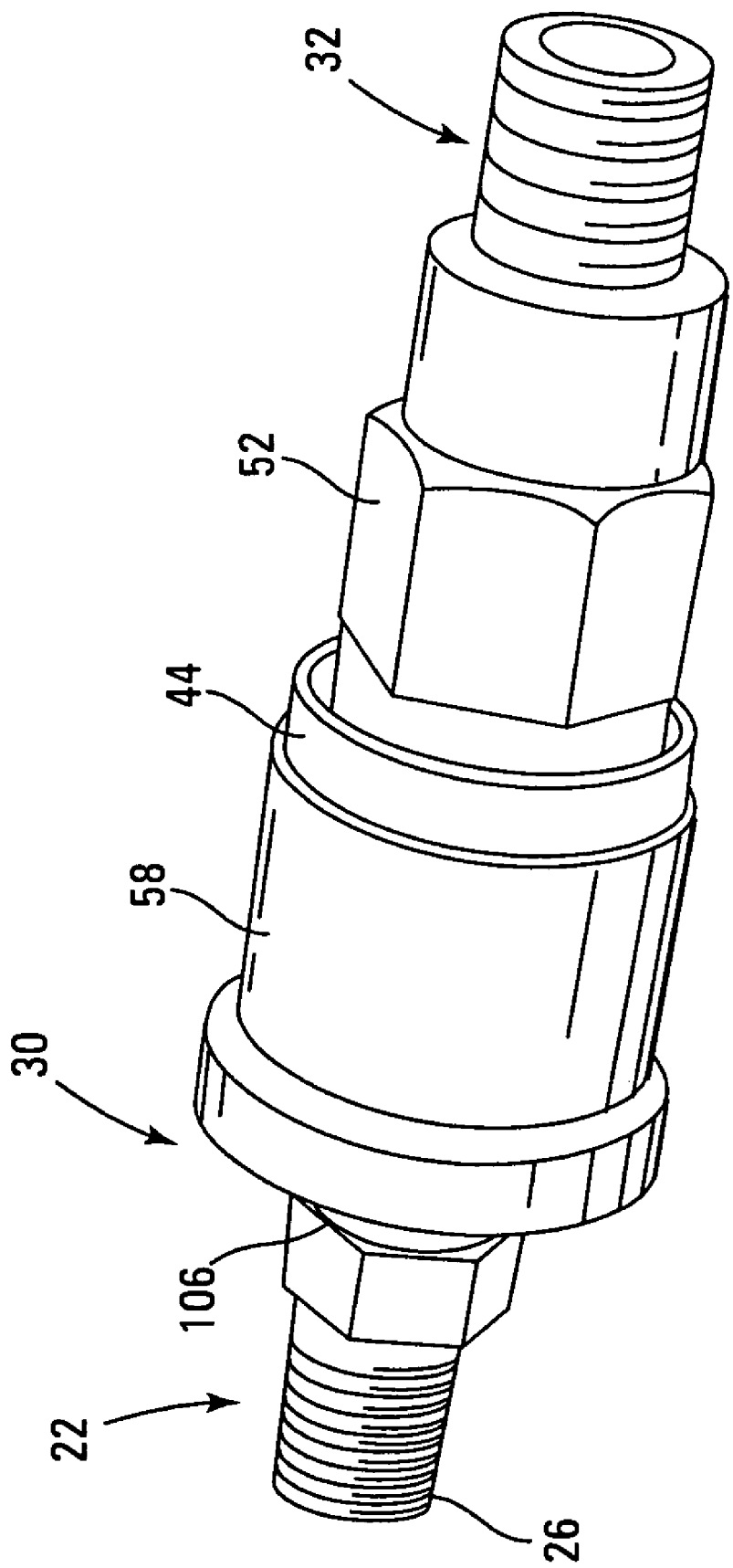
FIG. 2 is an axonometric projection of the connector of FIG. 1, in a connected position.

FIGS. 1 and 2 illustrate an embodiment of a connector 20 that is configured to provide fast, leak free connection to a fluid source, such as an oxygen tank.

With reference to FIGS. 1 and 2, the connector 20 includes a male connector portion 22 and a female connector portion 28. The female connector portion 28 is generally cylindrical and includes a proximal end 30 and a distal end 32. The female connector portion 28 defines a longitudinal channel 34 extending between the proximal and distal ends 30 and 32.

The male connector portion 22 includes a first end 24 and a second end 26. The male connector portion 22 defines a channel 36 extending between the first and second ends 24 and 26. The first end 24 of the male connector portion 22 is sized to be slideably inserted into the longitudinal channel 34 at the proximal end of the female connector portion 28 until obtaining a locked position 800, which will later be described in detail. The second end 26 is configured to be connected to a filler attachment or similar gas delivery means, thereby providing a channel for a gas 204, such as oxygen, to flow from the gas source connected to the distal end 32 of the female connector portion 28 and through the female connector portion 28 connected with the male connector portion 22.

Referring to FIG. 1, the female connector portion 28 includes an exterior sleeve 38. The exterior sleeve 38 functions to lock the male connector portion 22 to the female connector portion 28 by use of a widely known ball latching mechanism 64 embedded in the proximal end (i.e. the proximal end 30 of the female connector portion 28) of a mounting member 40 of the female connector portion 28. The exterior sleeve 38 is generally cylindrical and includes a proximal end 42 and a distal end 44. The exterior sleeve 38 is slideably mounted to an exterior surface of the mounting member 40 and an exterior surface of a housing 52 of the female connector portion 28.

A first interior annular shoulder 48 is located towards the proximal end 42 of the exterior sleeve 38. A sleeve spring 50 is captured between the first interior annular shoulder 48 of the exterior sleeve 38 and an exterior annular shoulder 54 formed by an indicator ring 110 (to be later described), located towards a proximal end 56 thereof. The sleeve spring 50 biases or urges the exterior sleeve 38 towards the proximal end 30 of the female connector portion 28. The exterior sleeve 38 is captured towards the proximal end 30 of the female connector portion 28 by abutment of a second interior annular shoulder 49 of the exterior sleeve 38 to an exterior annular shoulder 41 of the mounting member 40 of the female connector portion 28.

The mounting member 40 is mounted to the proximal end 56 of the housing 52, and the proximal end 56 of the housing 52 is disposed in the distal end 44 of the inner cavity of the exterior sleeve 38. The distal end 32 of the housing 52 is configured to be connected to the gas source. The exterior diameter of the exterior sleeve 38 is preferably larger towards the proximal end 42 so as to form an enlarged gripping portion 58. The exterior surface of the exterior sleeve 38 can also be textured so as to facilitate gripping.

The mounting member 40 is generally cylindrical and defines an outer groove 70 for receiving a sealing member 72. The sealing member 72 is preferably an annular elastomeric seal that forms a stationary, gas tight seal between the mounting member 40 and the interior surface of the housing 52.

A separate shroud 76 is held within the housing 52 by being captured between a distal end 45 of the mounting member 40 and a shoulder 77 formed on the interior of the housing 52. The distal end of the shroud 76 includes a shroud opening 80 through which gas 204 is able to flow while the connector is not in a fully connected state 600. The connected state 600 will be later described in detail. A proximal end 82 of the shroud 76 includes vents 84 through which gas 204 can flow to the interior of the mounting member 40.

Figure 3:
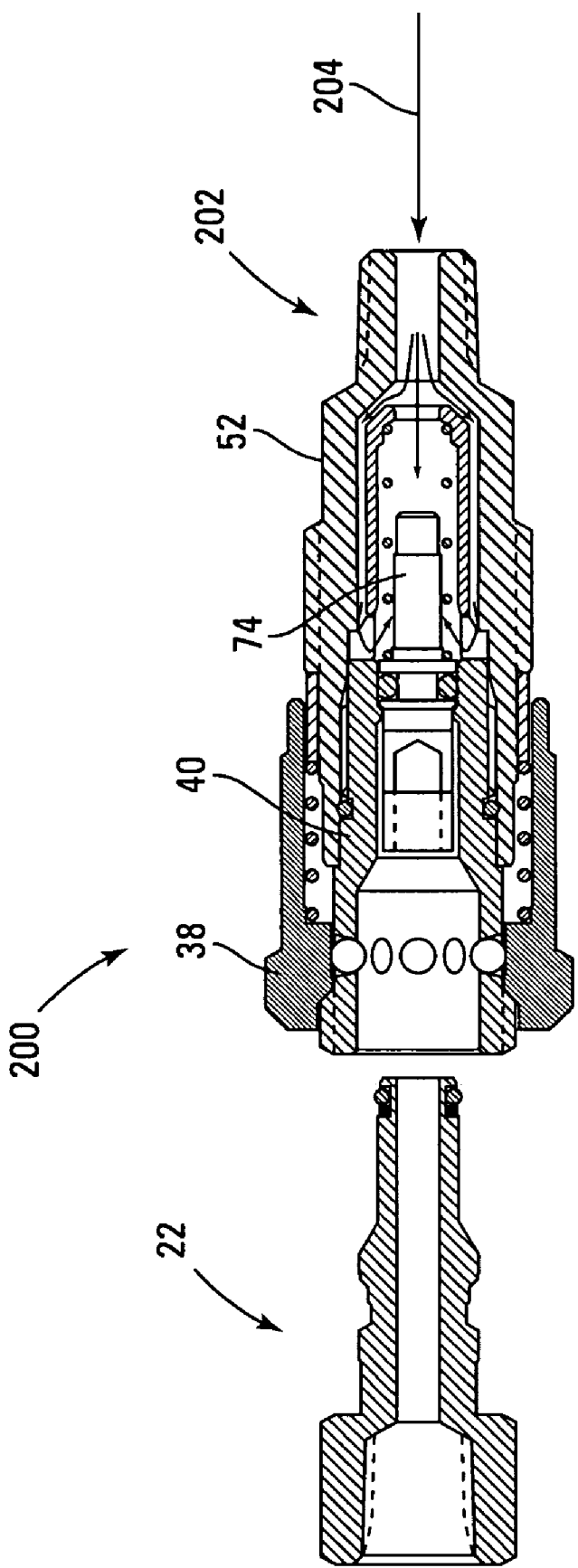
FIG. 3 is a cross-sectional view of the connector, in a disconnected position, illustrating a fluid flow path.
Figure 4:
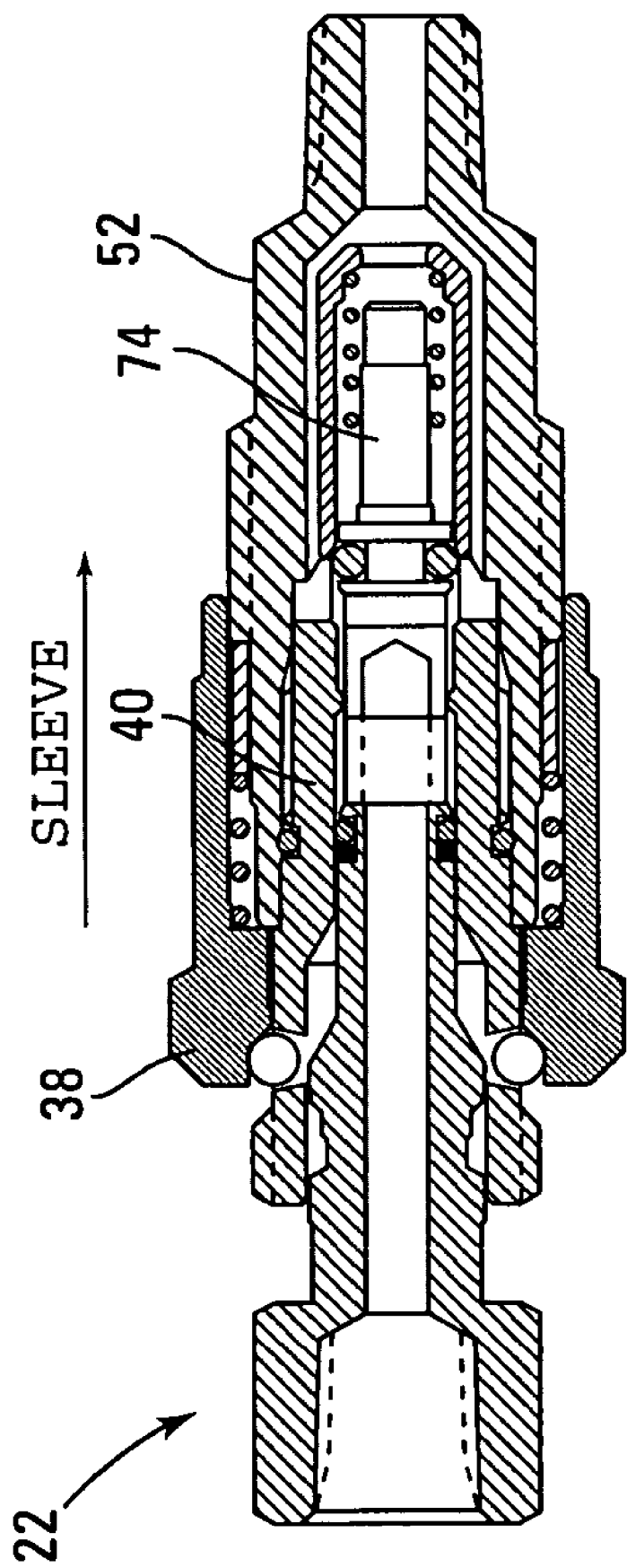
FIG. 4 is a cross-sectional view of the connector in a partially connected position, where the external sleeve is fully retracted and the ball latching mechanism is not engaged.

A poppet valve 74 is slideably disposed within the interior cavity of the mounting member 40. A blocking element 78 on the distal end of the poppet valve 74 is fully enclosed by the shroud 76 when the female connector portion 28 is in a disconnected state, as shown in FIGS. 3-4.

An exterior surface of the poppet valve 74 includes first and second lips 86, 88 which capture an O-ring 90 therebetween. The O-ring 90 provides a seal between the outer surface of the poppet valve 74 and an inner surface of the mounting member 40. In one example, the first and second lips 86, 88 project from the outer surface of the poppet valve 74. The second lip 88 abuts against an annular interior shoulder 92 of the mounting member 40, thereby capturing the poppet valve 74 and preventing the valve 74 from sliding out of the proximal end 30 of the mounting member 40.

A bias spring 94 is provided between the inner surface of the shroud 76 and the outer surface of the blocking element 78 of the poppet valve 74. The bias spring 94 acts between the first lip 86 of the poppet valve 74 and an interior shoulder 96 of the shroud adjacent to the opening 80 thereof, biasing the poppet valve 74 toward a closed position 202, as shown in FIG. 3. When the connector 20 is in the connected state 600 (and the poppet valve 74 is in a opened position 802), the blocking element 78 of the poppet valve 74 fits into the shroud opening 80 to limit gas flow, thereby protecting the bias spring 94 from rapid exposure to the gas 204 flowing through the connector 20.

A proximal end 79 of the poppet valve 74 includes cutout portions 75 in the generally cylindrical valve body that, upon connection of the female connector portion 28 to the male connector portion 22, provide a means by which the gas 204 is able to flow from the exterior of the poppet valve 74 on the blocking element 78 side, into the interior of the poppet valve 74 on the proximal end 79. Thus the poppet valve provides a means for the gas 204 to flow from the gas source connected to the housing 52, around the shroud 76 through the longitudinal channel 34, through the shroud vents 84, through the poppet valve 74 cutout portions 75, through the interior of the poppet valve 74, through the channel 36, and out of the second end 26 of the male connector portion 22.

In the illustrated embodiment, the male connector portion 22 is generally cylindrical and the channel 36 provided therethrough includes a wider diameter toward the second end 26. An exterior retaining shoulder 106 is provided towards the second end 26 of the male connector portion 22, and an exterior sealing member 98 is provided on the first end 24. Upon connection of the male connector portion 22 to the female connector portion 28, the sealing member 98 provides a seal between an exterior surface of the male connector portion 22 and an interior surface of the mounting member 40.

Circumferential first and second stage notches 100, 102 are provided on an outer surface of the male connector portion 22. The second stage notch 102 has a larger radius from a center axis 104 than the radius of the first notch 100. The significance of the double stage notches will be described in further detail below.

Referring to FIGS. 3-7, connection of the male connector portion 22 to the female connector portion 28 is now described in detail.

FIG. 3 shows the disconnected state 200. In the disconnected state 200, the poppet valve 74 is in the closed position 202, whereby any gas 204 coming from the gas source connected to the distal end 32 of the female connector portion 28 is prevented from flowing past the lip 88 and O-ring 90 of the poppet valve 74. As illustrated by arrows, the gas 204 can enter through the shroud opening 80 and into the longitudinal channel 34 surrounding the shroud 76. The longitudinal channel 34 is defined between the outer surface of the shroud 76 and the inner surface of the housing 52. The gas 204 is prevented from flowing through the female connector portion 28 by the seal provided by the lips 86, 88 and the O-ring 90 of the poppet valve 74.

FIG. 4 illustrates the beginning of the connection process. The exterior sleeve 38 is pulled back (i.e. slid axially towards the distal end 32 of the female connector portion 28) until the first interior annular shoulder 48 of the exterior sleeve 38 abuts the proximal end 56 of the housing 52. At this position, the balls of the ball latching mechanism 64 can move radially outward toward a second interior annular shoulder 49 provided towards the proximal end 42 of the exterior sleeve 38. Outward movement of the latching balls is caused by inserting the end of the male connector portion 22 into the female connector portion 28.

Figure 5:
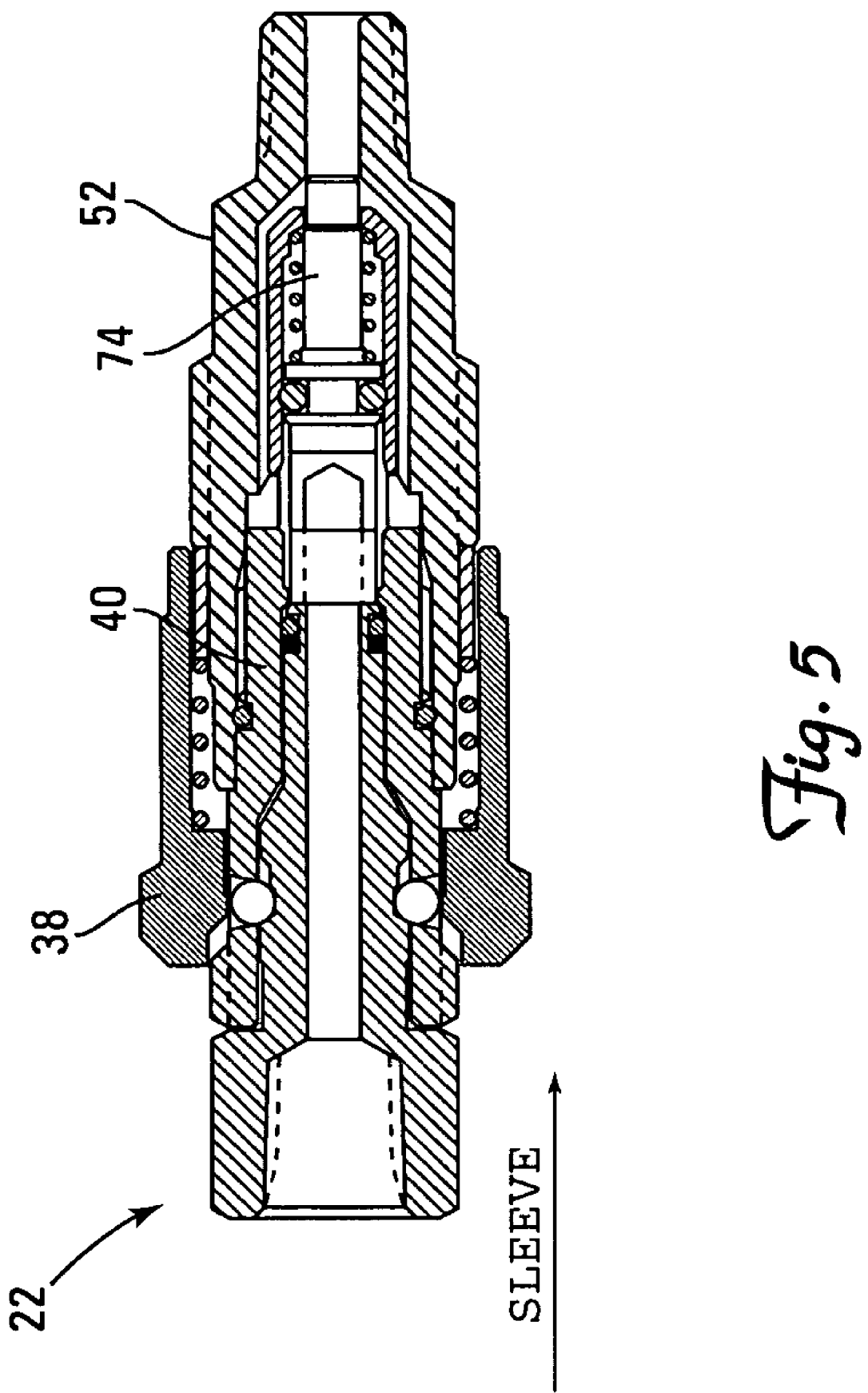
FIG. 5 is a cross-sectional view of the connector in a partially connected position, where the external sleeve is partially retracted and the ball latching mechanism is partially engaged.

With reference to FIG. 5, the male connector portion 22 continues to be inserted into the proximal end 30 of the female connector portion 28 until the exterior retaining shoulder 106 of the male connector portion 22 abuts the proximal end 30 of the mounting member 40. To achieve this abutment, the end of the male connector portion 22 engages the end 79 of the poppet valve 74 during insertion, which forces the poppet valve 74 to the right in FIG. 5 from its position shown in FIG. 4. Upon abutment, the balls of the ball latching mechanism 64 are aligned with the first stage notch 100 of the male connector portion 22 and can drop into the notch 100, thereby allowing the exterior sleeve 38 to be urged axially by the sleeve spring 50 back towards the proximal end 30 of the mounting member 40. In this position, the blocking element 78 of the poppet valve 74 enters into and limits the shroud opening and an opening 108 of the housing 52, thereby restricting flow of gas 204 into the shroud opening 80 and into the longitudinal channel 34.

Figure 6:
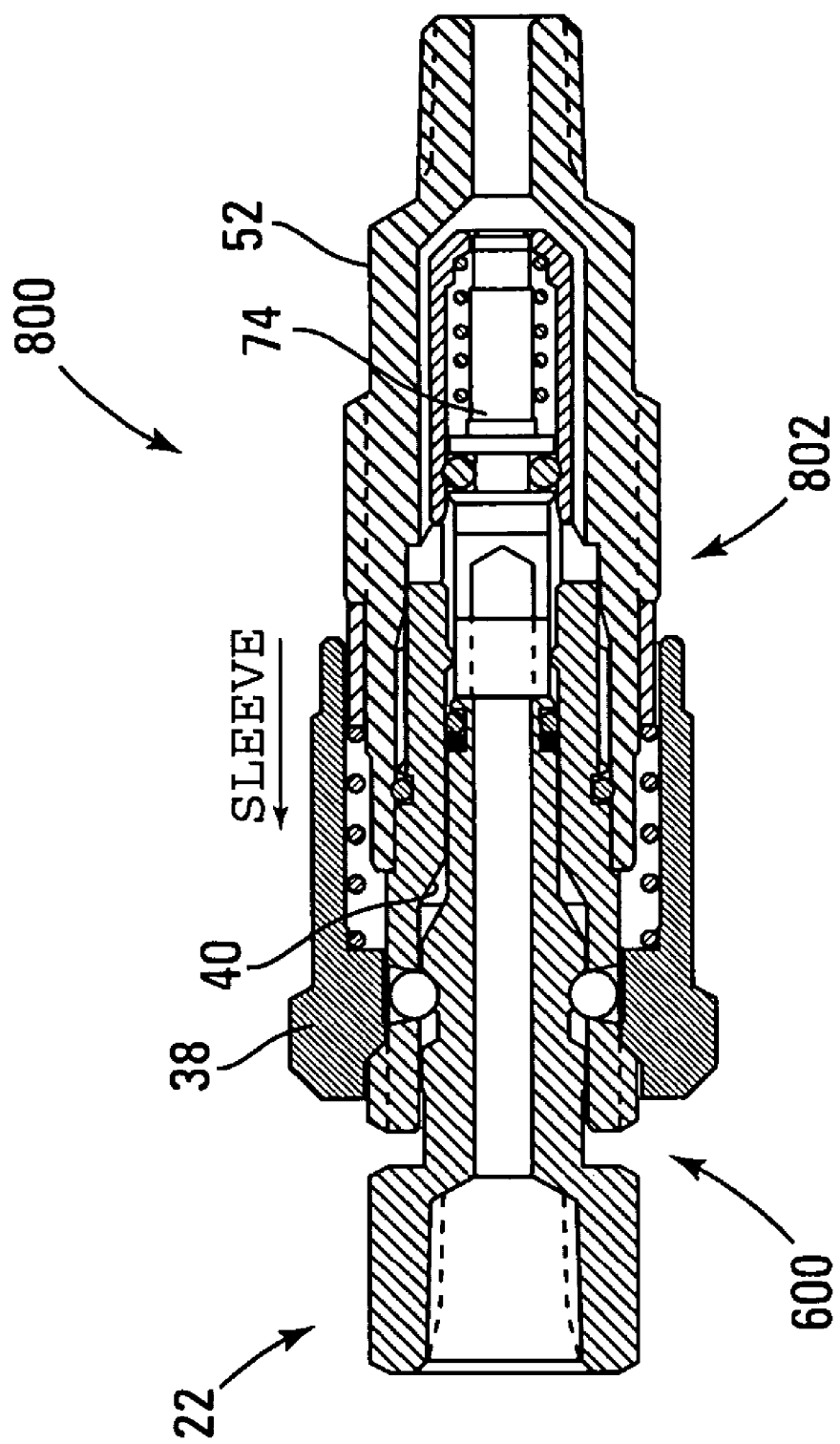
FIG. 6 is a cross-sectional view of the connector in a connected position, where the ball latching mechanism is locking the male connector portion to the female connector portion.
Figure 7:
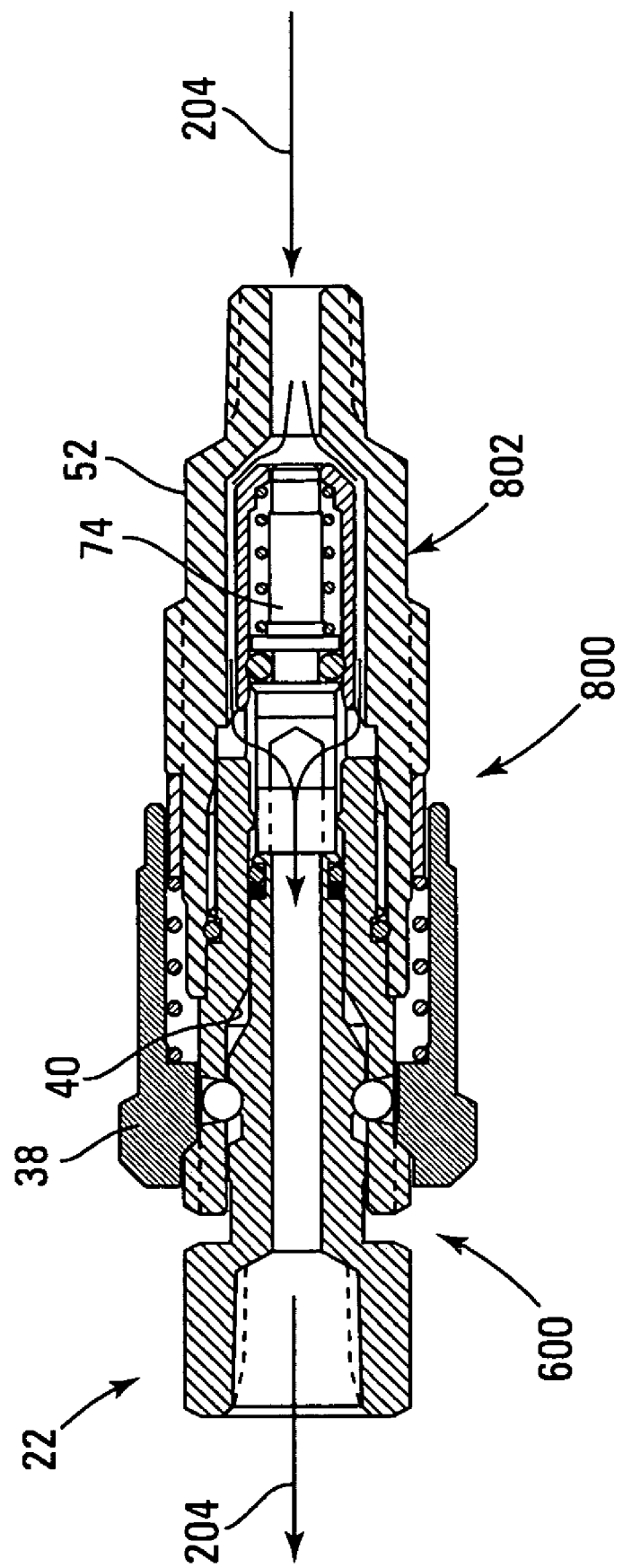
FIG. 7 is a cross-sectional view of the connector in a connected position, where the ball latching mechanism is locking the male connector portion to the female connector portion, and fluid is flowing through the connector.

With reference to FIGS. 6 and 7, the exterior sleeve 38 continues to be biased by the sleeve spring 50 toward the proximal end 30 until the second interior annular shoulder 49 of the exterior sleeve 38 abuts an exterior shoulder 41 of the mounting member 40. At the same time, the bias spring 94 in the shroud 76 biases the poppet 74 and the male connector portion 22 back toward the left in FIGS. 6 and 7 as shown by the arrow in FIG. 6. The movement of the male connector portion 22 back toward the left forces the balls of the ball latching mechanism 64 to move radially outward eventually becoming lodged between the second stage notch 102 of the adapter 22 and the exterior sleeve 38. This provides the connected position 800 of the coupler 28 and the adapter 22.

The sleeve 38 has a slight recess 95 defined on the interior surface thereof to accommodate the balls and therefore restrict the sleeve from movement to prevent disconnection while the connector is under pressure. When gas flows through the connector, the gas tends to force the male connector portion and the female connector portion apart, which forces the balls to ramp upward on the detent groove defining the notches 100, 102 and into the recess 95 on the sleeve. Since the latch balls are forced by the pressure of the gas into the recess, the sleeve 38 is prevented from being pulled backward while under pressure. The gas must be turned off, thereby releasing the pressure, to allow the male connector to be moved to the right so the balls 64 can move into the groove 100 and the sleeve can be pulled back to release the connection.

In the locked position 800, the end of the blocking element 78 of the poppet valve 74 is disposed in and limits the shroud opening 80 so that gas flow is restricted through the opening 80. Instead, gas flows primarily through the channel 34 around the shroud 76. As shown in FIGS. 6 and 7, in the connected position, the O-ring 90 and lips 86, 88 are disposed completely inside the shroud 76. The diameter of the lips 86, 88 and O-ring 90 are just slightly less than the internal diameter of the inner surface of the shroud 76 so that the O-ring and lips seal with the inner surface of the shroud. As a result, the O-ring 90 of the poppet valve 74 is protected from contact with the gas 204 by the shroud 76, and the lips 86, 88. In one example, the inner surface of the mounting member 40 is parallel to the inner surface of the shroud 76.

The connected position 800 shown in FIGS. 6 and 7 provides a channel through which the gas 204 flows through the female connector portion and through the male connector portion. As shown by the arrows in FIG. 7, the gas flows through the longitudinal channel 34 around the shroud 76, through the shroud vents 84, through the cutout portions 75 to the interior of the poppet valve 74, and then through the channel 36 of the male connector portion 22.

In order to disconnect the male connector portion 22 from the female connector 28, the gas flow is first turned off. A user then simultaneously pulls back the exterior sleeve 38 towards the distal end 32 of the housing 52 and pushes the male connector portion 22 back fully into the female connector portion 28 (in the direction of the arrow in FIG. 5). The balls of the ball latching mechanism 64 can thus drop into the first stage notch 100 of the male connector portion 22, which permits the sleeve 38 to be pulled all the way back, thereby unlocking the male connector portion 22 from the mounting member 40 of the female connector portion 28, as shown in FIG. 4. The male connector portion 22 is then fully removed from the female connector portion 28, as shown in FIG. 3.

As shown in FIG. 1, the housing 52 can include an indicator ring 110 on the external surface thereof. The indicator ring 110, which has a color that is different from adjacent portions of the female connector portion 28, is disposed partially within the sleeve 38, and defines the shoulder 54. The indicator ring 110 provides visual feedback to the user to indicate whether proper connection has been achieved or not. At both the disconnected and connected positions shown in FIGS. 3 and 7 respectively, a portion of the ring is visible. However, when the sleeve 38 is pulled back as shown in FIGS. 4 and 5, the ring is covered up. If the connector fails to properly connect, the sleeve 38 will not return to the positions shown in FIGS. 3 and 7, and will instead remain in position covering the ring 110. Therefore, if the indicator ring 110 is visible, that would indicate that proper connection has been achieved.

Figure 8:
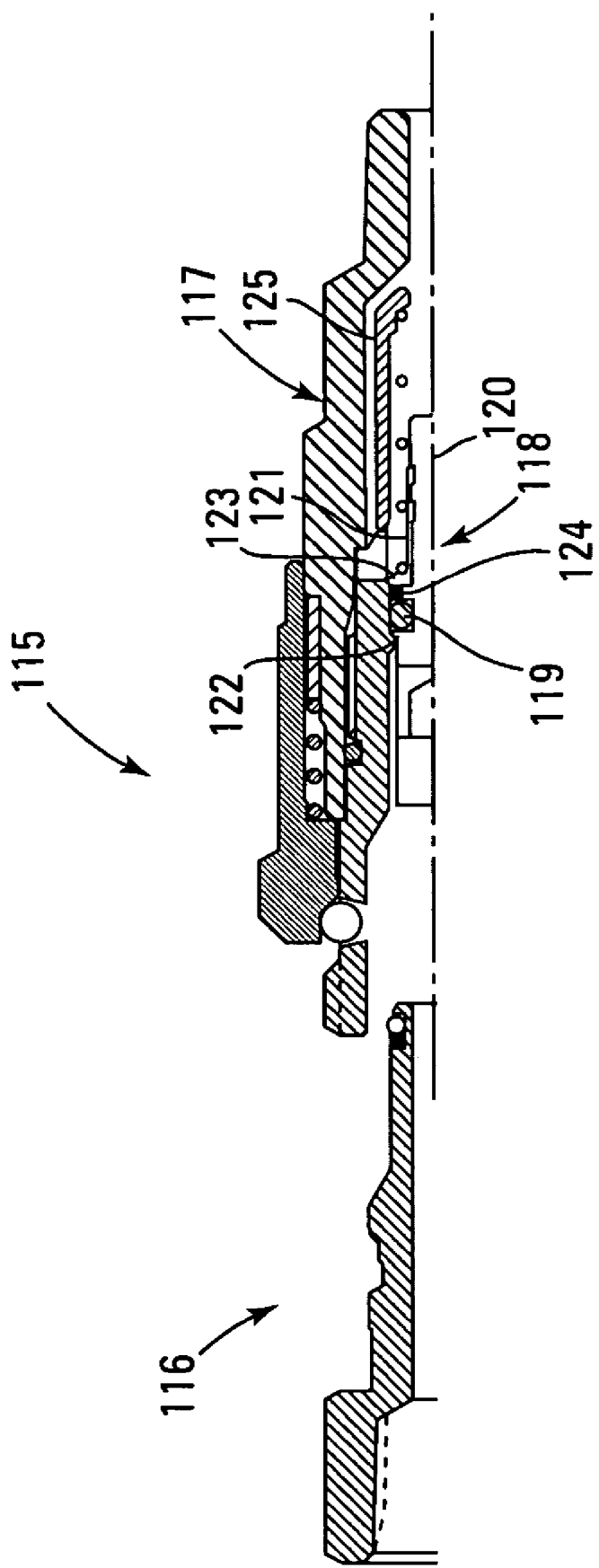
FIG. 8 is a partial cross-sectional view of an alternative embodiment of the connector of FIG. 1.

FIG. 8 illustrates an alternative embodiment of a connector 115 that is similar to the connector 20, including a male connector portion 116 and a female connector portion 117.

The male connector portion 116 and female connector portion 117 are similar to the male connector 22 and the female connector portion 28. One difference is that the female connector portion 117 is provided with means to limit extrusion of the poppet valve 118 o-ring 119, particularly under high gas pressures, for example at pressures greater than 750 psig.

In this embodiment, the poppet valve 118 is a two-piece construction, including a primary portion 120 and a secondary portion 121 that is secured to the primary portion, for example by swaging. The primary portion 120 defines a lip 122 and the secondary portion 121 defines a lip 123. A back-up ring 124, for example a ring made of Teflon®, is disposed around the primary portion 120 between the o-ring 119 and the lip 123. The ring 124 helps to limit the gap between the poppet 118 and the interior surface of the shroud 125 when the connector 115 is under pressure to limit any extrusion of the o-ring 119 from the gap between the lip 123 and the shroud 125.

The secondary portion 121 is necessary to allow introduction and placement of the ring 124 around the primary portion 120. The secondary portion 121 is then placed around the primary portion 120 and secured to the primary portion, for example by swaging.

Figure 9:
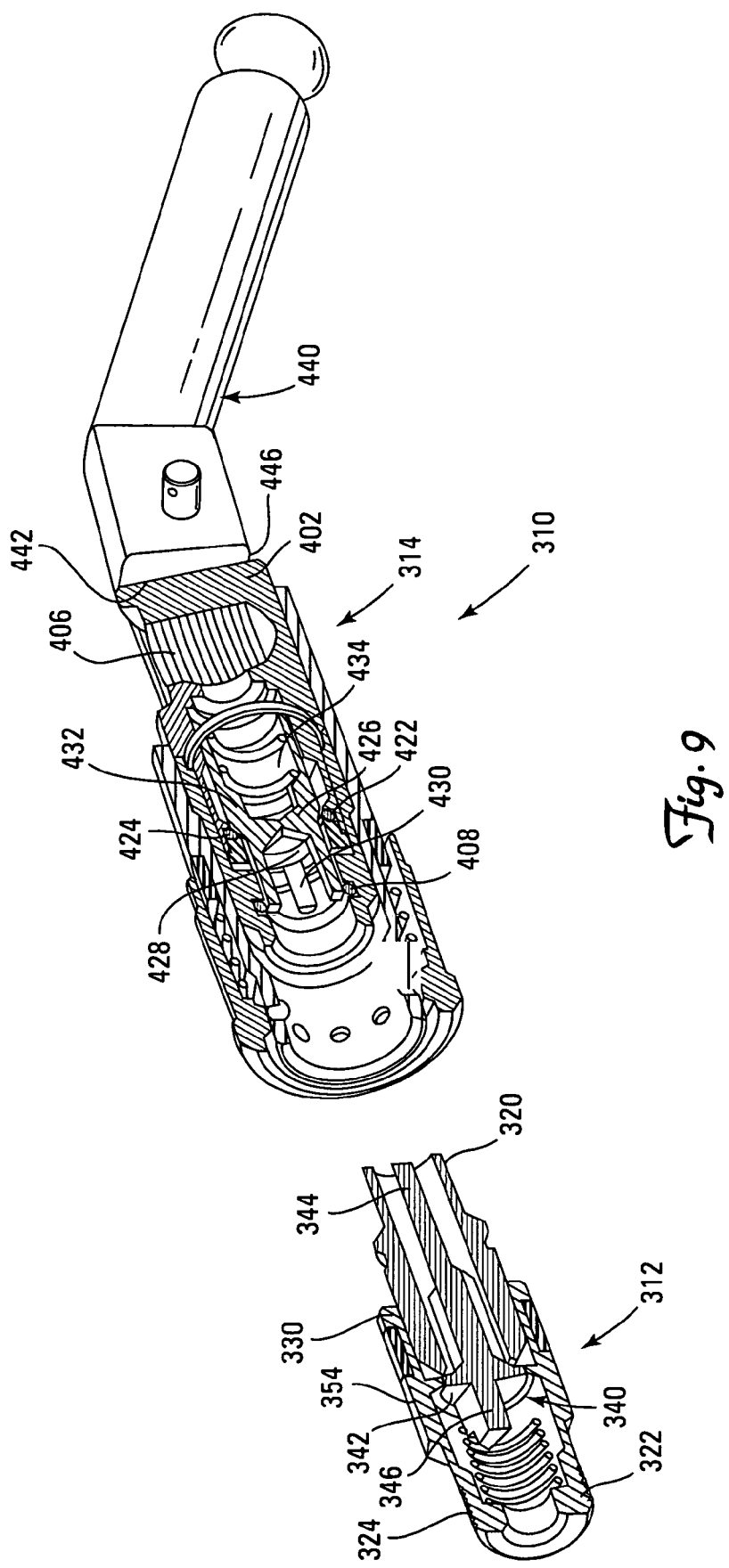
FIG. 9 is a perspective view of another embodiment of a latching connector with the male portion and the female portion shown in cross-section and with the connector in a disconnected position.
Figure 10:
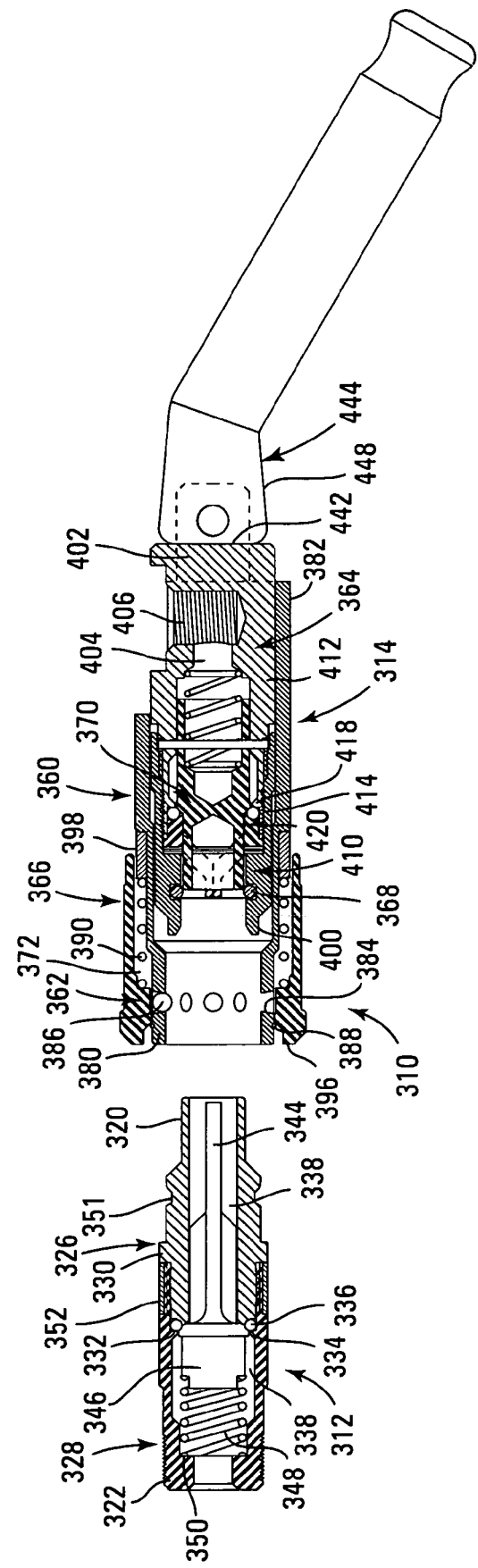
FIG. 10 is a cross-sectional side view of the connector of FIG. 9.

With reference to FIGS. 9 and 10, a connector 310 is shown that can be used to connect an external system to a fluid system for performing processing operations, for example charging, evacuation and/or testing, on the fluid system. The connector 310 includes a male connector portion 312 configured for connection to the fluid system (not shown) and a female connector portion 314 configured for connection to the external system (not shown).

The fluid system can be, for example, a refrigerant loop of an air conditioning system. The external system can be, for example, a source of refrigerant for charging the air conditioning system, a source of low pressure for evacuating the air conditioning system, or testing equipment for testing the air conditioning system. However, the connector 310 can be used with other fluid systems and other external systems.

The male connector portion 312 includes a first end 320 or tip that is insertable into the female connector portion 314, and a second end 322 that is connectable to the fluid system. As shown in FIG. 9, the second end 322 includes threads 324 on the exterior surface of the male portion 312 that can be used to connect the male portion to the fluid system.

The male portion 312 is formed by a first threaded piece 326 and a second threaded piece 328 connected to the first threaded piece 326. The first threaded piece 326 includes the first end 320, while the second threaded piece 328 includes the second end 322. The end of the first threaded piece 326 that is opposite the first end 320 is exteriorly threaded and is engaged within an interiorly threaded end of the second threaded piece 328 opposite the second end 322. A shoulder 330 on the exterior surface of the first threaded piece 326 abuts against the end of the second threaded piece 328 to limit how far the first threaded piece 326 travels into the second threaded piece 328. In addition, a shoulder 332 projects inwardly from the interior surface of the second threaded piece 328 and is spaced slightly to the left (when viewing FIG. 10) of the end of the first threaded piece 326 to define a groove 334 therebetween. A seal 336, for example an o-ring seal, is disposed within the groove 334.

Figure 13:
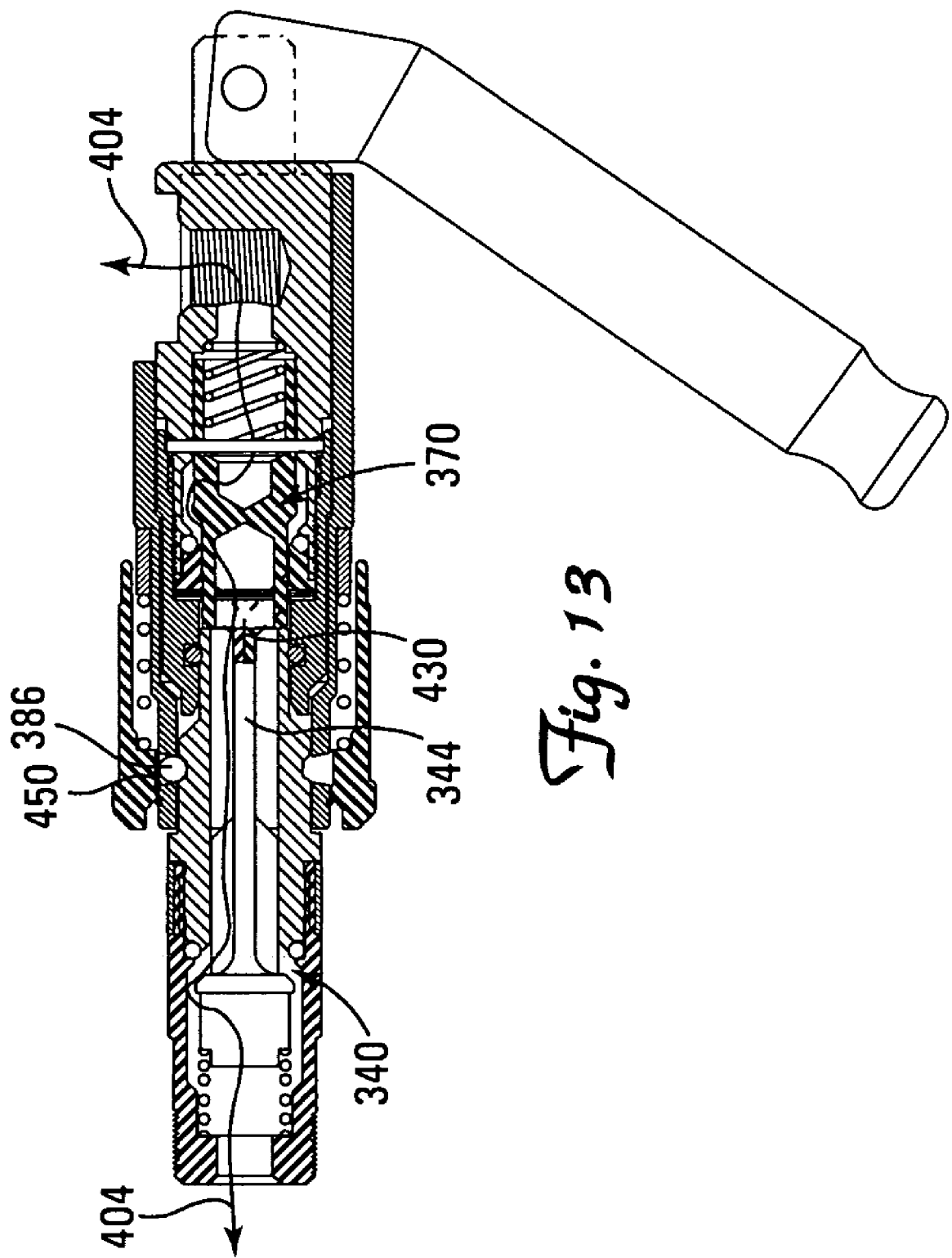
FIG. 13 is a cross-sectional side view of the connector of FIG. 9 in a fully connected stage with the valves opened and with arrows illustrating the fluid flow path.

When the first and second threaded pieces 326, 328 are connected, they define a fluid flow path 338 therethrough. A valve 340 is disposed in the male portion 312 for controlling flow through the fluid flow path 338. The valve 340 comprises a poppet valve and includes a valve head 342 that seals with the seal 336. An actuating pin 344 extends from the valve head 342 toward the first end 320, with the pin 344 terminating short of the first end 320. In addition, a post 346 extends from the valve head 342 toward the second end 322. A bias spring 348 is disposed between the end of the post 346 and a shoulder 350 within the second threaded piece 328 to bias the valve 340 toward the right in FIG. 10 to a closed position so that the valve head 342 is normally sealed with the seal 336 to prevent fluid flow through the flow path 338. As shown in FIG. 13, the valve 340 is actuatable to the left against the bias of the spring 348 to an open position, where the valve head 342 unseats from the seal 336, to permit fluid flow through the flow path 338.

Returning to FIGS. 9 and 10, a circumferential channel 351 is defined in the outer surface of the first threaded piece 326. The channel 351 provides a location for engagement by a latch connector (to be later described) of the female connector portion 314. In addition, a colored ring 352 having a color different than the color of the first and second threaded pieces 326, 328, is disposed on the male portion 312 between the shoulder 330 and a hexagonal flat 354 formed on the second threaded piece 328.

The first and second threaded pieces 326, 328 are preferably formed from metal, for example brass.

The female connector portion 314 is configured to receive the end of the male connector portion 312 and connect to the male portion 312. The female connector portion 314 includes a latch body 360 with a latch connector 362 for connecting the female connector portion 314 to the male connector portion 312, a piston 364 slideably disposed in the latch body 360, an actuating sleeve 366 surrounding the latch body 360 and configured to actuate the latch connector 362 to control connection of the female connector portion 314 to the male connector portion 312, a main seal 368 on the piston 364 positioned for sealing engagement with the male connector portion, and a second valve 370 disposed in the piston 364.

The latch body 360 includes a first end 380 disposed toward the male connector portion 312 and a second end 382 toward a right end (as viewed in FIG. 10) of the female connector portion 314. Adjacent the first end 380, the latch connector 362 is formed and includes a plurality of circumferentially spaced holes 384 defined in the latch body 360 in which latch balls 386 are disposed. The latch body 360 extends to the right in FIG. 10 to the second end 382 and surrounds the piston 364.

The actuating sleeve 366 surrounds the latch body 360 and controls radial outward movement of the latch balls 386. The actuating sleeve 366 is retained on the latch body 360 via a retaining ring 388 disposed on the first end 380 of the latch body 360. A bias spring 390 is disposed between the actuating sleeve 366 and a colored ring 398 for biasing the actuating sleeve 366 to the left in FIG. 10 to a connected position. The spring 390 engages a shoulder 392 formed on the interior of the actuating sleeve 366. The front end of the actuating sleeve 366 includes a recess 396 into which the latch balls 386 can temporarily travel during connection to the male connector portion 312.

The colored ring 398 has a color different than the color of the actuating sleeve 366 and latch body 360 and is disposed on the latch body 360 so as to project beyond the right end of the actuating sleeve 366 when the actuating sleeve 366 is at the connect position. The colored ring 398 provides a visual indication that proper connection has been achieved with the male connector portion 312. When there is a proper connection, the actuating sleeve 366 is able to return to the connected position and the ring 398 will be visible. If proper connection has not been achieved, the actuating sleeve 366 is not able to return to the connected position and the actuating sleeve 366 will cover the ring 398 so that the ring 398 will not be visible.

In addition, the ring 398 preferably has the same color as the color of the ring 352 on the male connector portion 312. The ring 352 and ring 398 provide color code matching of the male connector portion 312 and the female connector portion 314 to indicate that the correct female connector portion is being connected to the correct male connector portion.

The piston 364 is slideably disposed in the latch body 360, and includes a forward end 400 and a rear end 402. The piston 364 defines a fluid flow path 404 therethrough extending from the forward end 400 to adjacent the rear end 402. As shown by the arrow in FIG. 13, fluid can exit or enter the flow path 404 through a port 406 adjacent the rear end 402 that is disposed generally radially to the axis of the flow path 404. The port 406 is internally threaded for being secured to a fluid flow line connected to the processing equipment.

A circumferential groove 408 is formed on the interior of the piston 364 adjacent the forward end 400 and the main seal 368 is disposed in the groove 408. The main seal 368 provides sealing engagement with the male connector portion 312 when the male connector portion is connected to the female connector portion.

The piston 364 is formed by first and second primary pieces 410, 412, with the pieces 410, 412 being secured to each other by threads 414 on an end of the second piece 412 and on the first piece 410. In addition, a shoulder 418 is formed on the interior surface of the second piece 412, and a washer 420 is slip fit into the interior of the second piece 412 and captured by the first piece 410 so as to face the shoulder 418 and define therewith a groove 422 for receiving a seal 424, for example an o-ring seal.

The valve 370 is slideably disposed in the piston 364. The valve 370 comprises a poppet valve and includes a valve head 426 that seals with the seal 424. An extension 428 extends forward from the valve head 426, with the extension 428 having a diameter that is approximately equal to the diameter of the first end 320 of the male connector portion 312. An actuating pin 430 is disposed within the extension 428 and attached to the washer 420 for engaging with the actuating pin 344 of the valve 340. A cylindrical extension 432 also extends rearwardly from the valve head 426. A bias spring 434 is disposed in the extension 432 to bias the valve 370 toward the left in FIG. 10 to a closed position so that the valve head 426 is normally sealed with the seal 424 to prevent fluid flow through the flow path 404. As shown in FIG. 13, the valve 370 is actuatable to the right against the bias of the spring 434 to an open position, where the valve head 426 unseats from the seal 424, to permit fluid flow through the flow path 404.

With reference to FIG. 9, the latch body 360 in the area of the port 406 is cut-out to allow passage of the port. On both sides of the female portion 314, the latch body 360 extends slightly beyond the rear end 402 of the piston 364. An actuating lever 440 is pivotally connected to the second end 382 of the latch body 360. The lever 440 includes a first surface 442 that, in the disconnected state shown in FIG. 10, is engaged with the rear end 402 of the piston 364. The lever 440 also includes a cam surface 444 that includes a corner 446 of the lever 440 and a second surface 448. As the lever 440 is pivoted clockwise, the cam surface 444 engages the rear end 402 of the piston 364 and actuates the piston 364 to the left in FIG. 10. A similar cam surface can be defined on the lever 440 opposite the cam surface 444 to allow the lever 440 to be pivoted either clockwise or counterclockwise.

The operation of the connector 310 will now be described with reference to FIGS. 10-15. At the position shown in FIG. 10, the valve of the male connector portion and the valve of the female connector portion are closed, preventing fluid flow through either connector portion.

To achieve connection between the male connector portion 312 and the female connector portion 314, the actuating sleeve 366 is pulled backward against the bias of the spring 390. The sleeve 366 is pulled back a sufficient distance so that the recess 396 is positioned radially outward of the balls 386, thereby permitting the balls 386 to travel radially outward into the recess 396. The end of the male portion 312 is then inserted into the female portion 314 and the actuating sleeve 366 is released. The spring 390 forces the actuating sleeve 366 back to the connect position, forcing the balls back down so that the latch balls reside in the channel 351 in the male connector portion 312.

Figure 11:
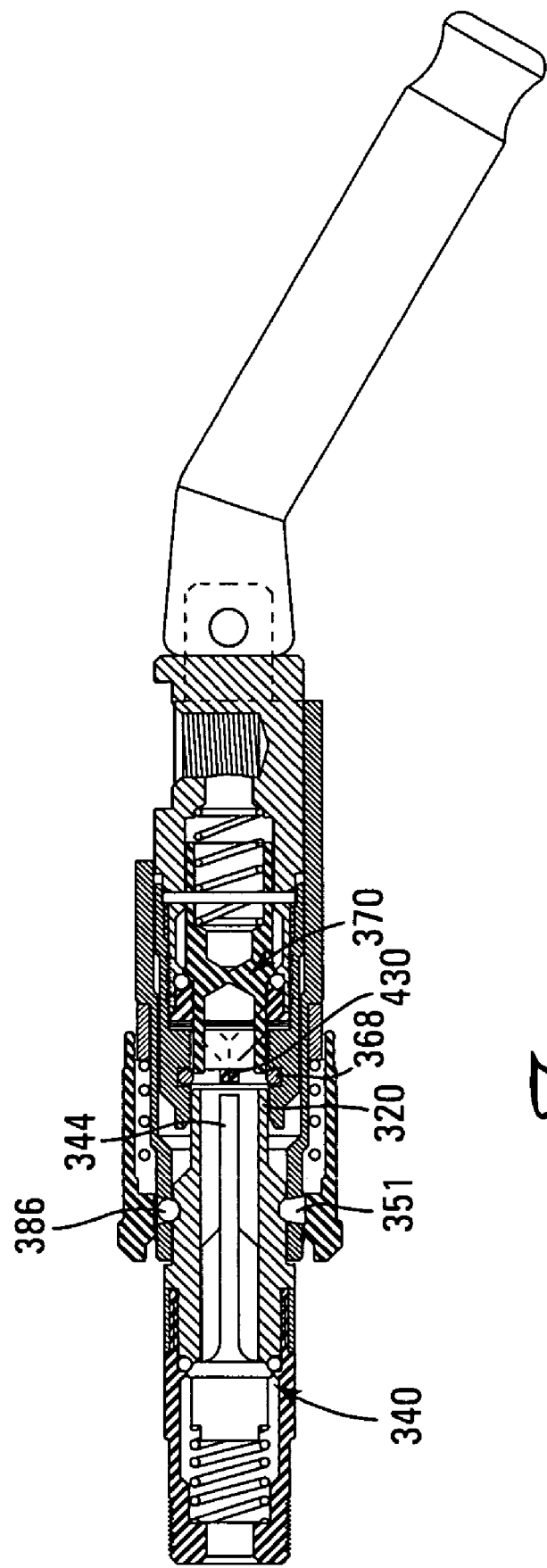
FIG. 11 is a cross-sectional side view of the connector of FIG. 9 with the female and male portions in a connected stage, not sealed, and with the valves closed.

FIG. 11 illustrates the connected stage of the connector 310, where the female connector portion and the male connector portion are connected by the latch connector 362, the valves 340, 370 remain closed, and the main seal 368 of the female connector portion 314 is not sealed against the end 320 of the male connector portion 312.

Figure 12:
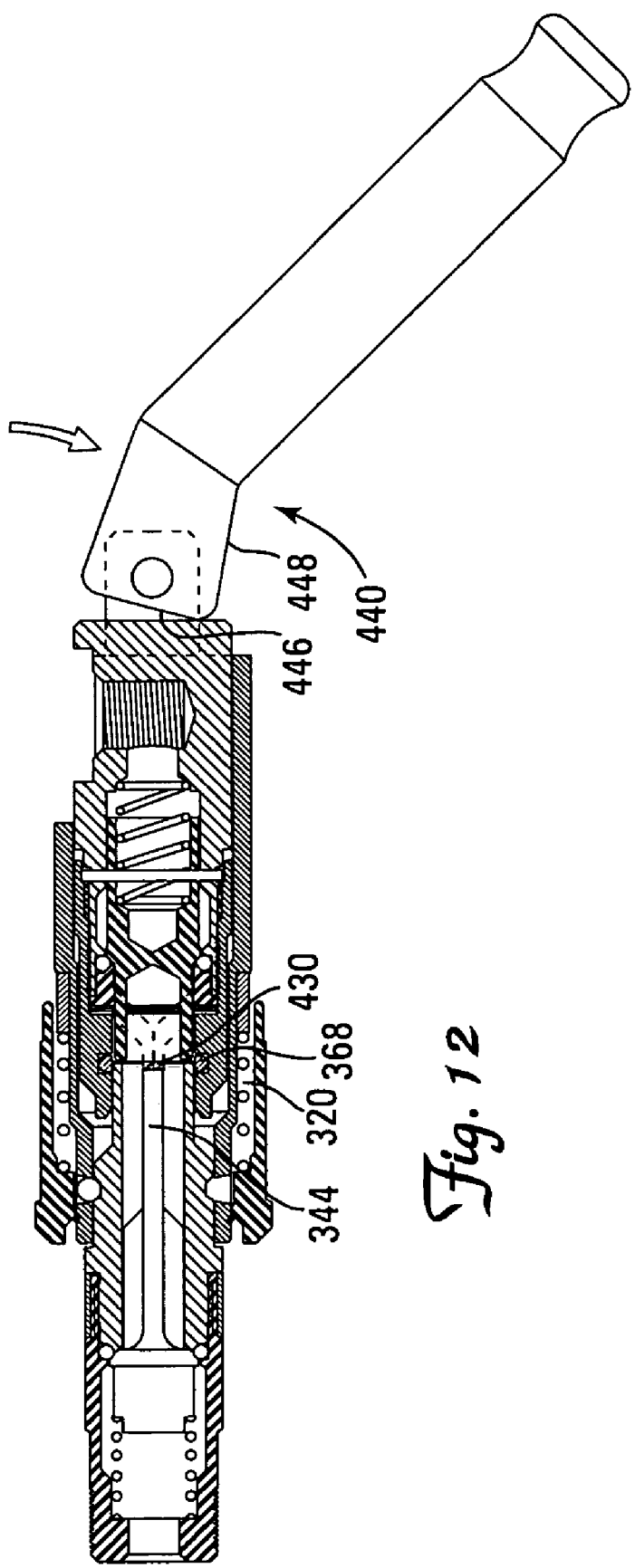
FIG. 12 is a cross-sectional side view of the connector of FIG. 9 in an intermediate stage with the tip of the male portion sealed against the female portion, and with the valves closed.

Turning to FIG. 12, the actuating lever 440 is used to achieve sealing and opening of the valves 340, 370. As the actuating lever 440 is being pivoted clockwise, the piston 364 is forced to the left, drawing the male connector portion and the female connector portion together so that the main seal 368 seals against the end 320 of the male connector portion 312. This will prevent any fluid from escaping from the connector 310 when the valves ultimately open. The configuration shown in FIG. 12 can be termed an intermediate stage, where the female connector portion and the male connector portion are connected by the latch connector, the first and second valves remain closed, and the male connector portion is sealed with the seal on the piston Turning to FIG. 13, further actuation of the lever 440 in a clockwise direction causes the male actuating pin 344 to engage the actuating pin 430 and the male end 320 to engage the female poppet extension 432, opening the valves 340, 370. When the lever 440 is fully pivoted to the position shown in FIG. 13, the valves 340, 370 are fully opened allowing fluid flow through the connector as illustrated by the arrows. This is termed the fully connected stage of the connector, where the female connector portion and the male connector portion are connected by the latch connector, the first and second valves are open, and the male connector portion is sealed with the seal on the piston.

When fluid flows through the connector 310, the pressure of the fluid creates a force tending to force the male connector portion 312 and the female connector 314 away from each other. This causes the latch balls 386 to be forced radially outward due to the sloped sides of the channel 351. The actuating sleeve 366 includes a circumferential detent groove 450 into which the balls are forced. The balls within the detent groove 450 prevent the actuating sleeve 366 from being pulled backward while the connector 310 is under pressure to prevent accidental disconnection under pressure.

Figure 14:
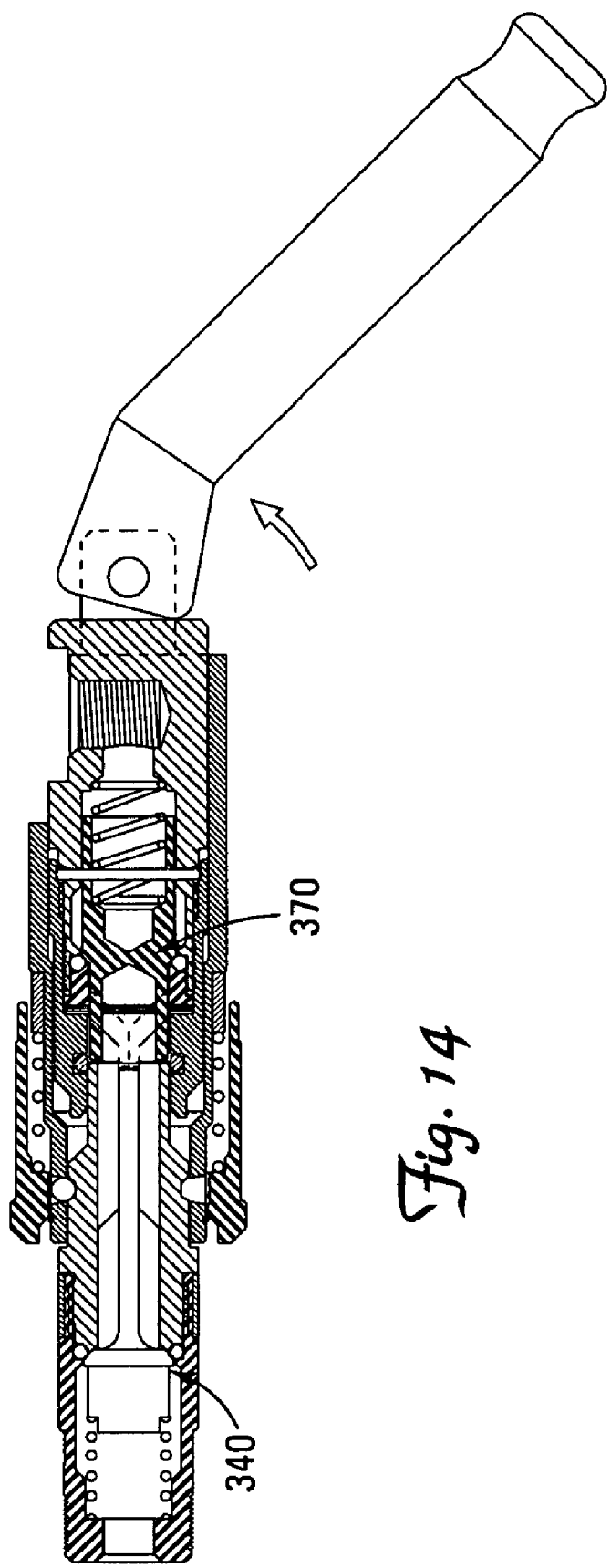
FIG. 14 is a cross-sectional side view of the connector of FIG. 9 at the start of disconnection.

FIG. 14 illustrates the beginning of disconnection. The lever 440 is rotated back in a counterclockwise direction to achieve closure of the valves 340, 370. Once the valves close, pressurized fluid is trapped in the region between the two valves 340, 370. That pressurized fluid must be vented before the actuating sleeve can be pulled back to disconnect the male and female portions.

Figure 15:
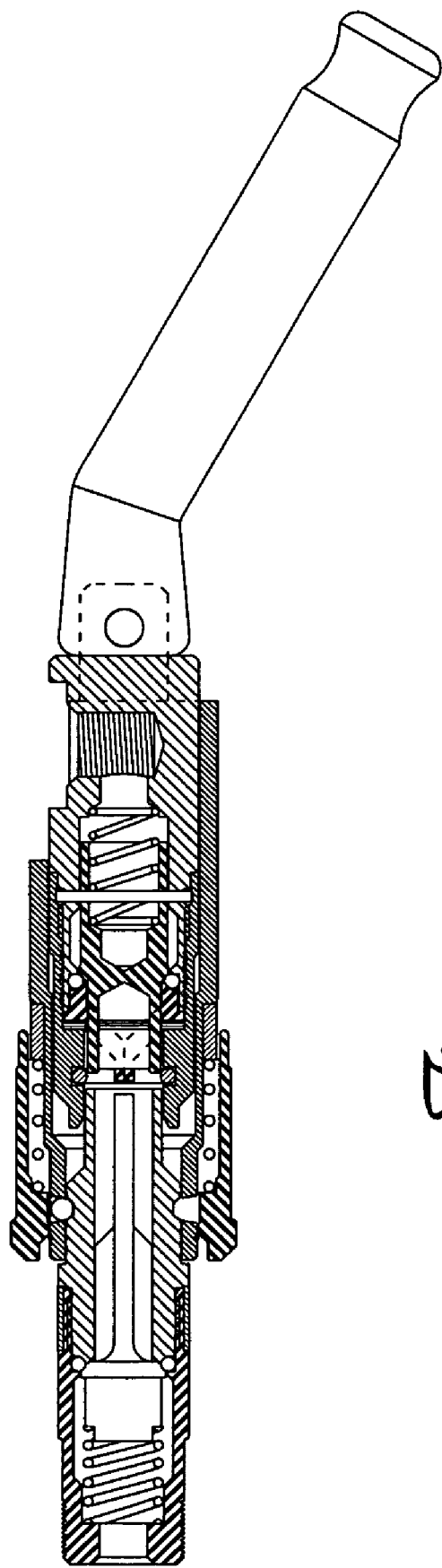
FIG. 15 is a cross-sectional side view of the connector of FIG. 9 with the male portion and female portion losing their seal in order to vent the pressure.

As shown in FIG. 15, as the lever 440 rotates back to its home position, the seal between the main seal 368 and the male connector end 320 is lost, allowing the trapped fluid to vent as shown by the arrows. The sleeve 366 can then be pulled back to release the latch connector and disconnect the male and female connector portions. This can be termed a vent stage.

Figure 16:
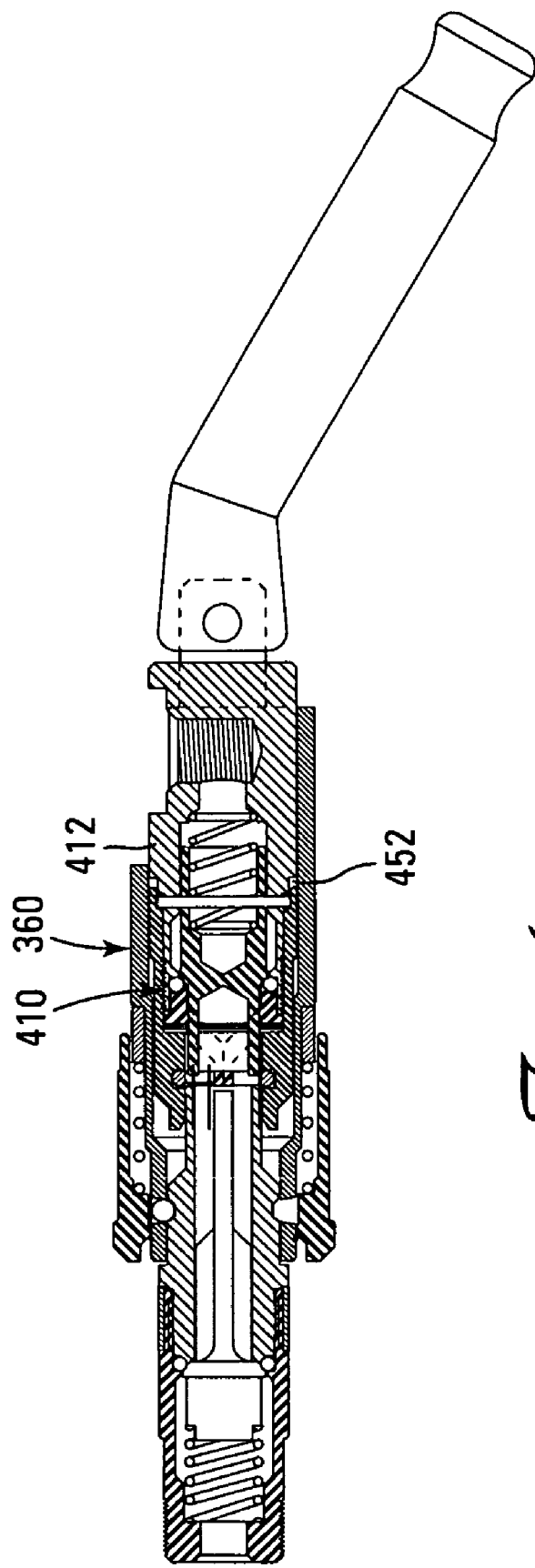
FIG. 16 is a cross-sectional side view similar to FIG. 15 with a deflector added to deflect vented fluid away from the user.

FIG. 16 illustrates a deflector 452, for example a ring, positioned between the two primary pieces 410, 412 of the piston 364 and the latch body 360. The deflector 452 creates a restriction to limit venting from occurring in the direction toward the lever 440, and deflect fluid toward the end of the female connector portion that includes the latch connector. This limits venting toward the operator of the connector.

The invention claimed is:

1. A connector for providing a connection to a gas source, the connector comprising:
 a female connector portion connectable to the gas source, wherein the female connector portion includes:
 an exterior sleeve,
 a mounting member that includes a ball latching mechanism and an interior surface with a sealing surface,
 a shroud that includes an interior surface with a sealing surface,
 a poppet valve slideably disposed within an interior of the mounting member and within an interior of the shroud, the poppet valve including an o-ring retained between a first lip and a second lip to provide a seal between an outer surface of the poppet valve and the sealing surface of the mounting member and between the outer surface of the poppet valve and the sealing surface of the shroud, the first and second lips projecting from the outer surface of the poppet valve so as to capture the o-ring and to protect the o-ring from contact with gas from the gas source, and the sealing surface of the mounting member being parallel to the sealing surface of the shroud,
 a connector housing;
 wherein the exterior sleeve is slideably mounted on an exterior surface of both the mounting member and the connector housing,
 the mounting member is separate from and mounted to the connector housing and extends from an end thereof,
 the shroud surrounds at least a portion of the poppet valve and includes an outermost proximal end adjacent the mounting member, the outermost proximal end having vent openings that provide gas flow between an interior of the shroud and an exterior of the shroud, and the shroud further includes a distal end spaced from the outermost proximal end with a gas flow opening formed in the distal end that provides gas flow between the interior of the shroud and the exterior of the shroud, the poppet valve includes a flow restriction element at an end thereof, and the flow restriction element is disposable within the gas flow opening at the distal end of the shroud, and the outermost proximal end of the shroud abuts an end of the mounting member and a shoulder of the connector housing so that the shroud is fixed to the mounting member and the connector housing; a first spring is engaged with the exterior sleeve to bias the exterior sleeve towards the end of the mounting member, and
 a second spring is engaged with the poppet valve to bias the poppet valve to a closed position to seal with the interior surface of the mounting member.

2. The connector according to claim 1, wherein the mounting member includes an outer circumferential groove that receives a sealing member that forms a seal between an outer surface of the mounting member and an interior surface of the connector housing.

3. The connector according to claim 1, further comprising:
 a male connector portion connectable to a gas delivery means, wherein the male connector portion includes a channel extending from a first end thereof to an opposite, second end thereof for defining a gas flow path therethrough, and an exterior surface sized to be inserted into the interior of the mounting member, the exterior surface of the male connector portion including first and second circumferential notches configured for engagement with the ball latching mechanism, and a radius of the second notch is larger than a radius of the first notch.

4. The connector according to claim 3, wherein the male connector portion further comprises:
 an exterior seal provided adjacent the first end wherein upon insertion of the male connector portion into the mounting member, the exterior seal seals between the exterior surface of the male connector portion and the interior surface of the mounting member.

5. The connector according to claim 3, wherein the exterior sleeve has a recess defined on an interior surface thereof, and wherein balls of the ball latching mechanism are disposed in the second circumferential notch and in the recess of the exterior sleeve when the male connector portion is connected to the female connector portion and gas under pressure is introduced into the connector, whereby the sleeve is locked to prevent disconnection.

6. A connector for providing a connection to a gas source, the connector comprising:
 an exterior sleeve that is moveable between a first position and a second position;
 a mounting member that includes an interior surface with a sealing surface and a latching mechanism, the latching mechanism being disposed adjacent a first end of the mounting member;
 a shroud that includes an interior surface with a sealing surface, the shroud being separate from the mounting member and extending from a second end of the mounting member;
 a poppet valve slideably disposed within the mounting member and the shroud, the poppet valve being moveable between a closed position, an insertion position, and an open position intermediate the closed position and the insertion position; the poppet valve including a seal retained between a first lip and a second lip, the seal providing a seal between the poppet valve and the sealing surface of the mounting member when the poppet valve is at the closed position and provides a seal between the poppet valve and the sealing surface of the shroud when the poppet valve is at the insertion and open positions; the first and second lips projecting from the outer surface of the poppet valve so as to capture the seal and to protect the seal from contact with gas from the gas source;
 the sealing surface of the mounting member being parallel to the sealing surface of the shroud;
 a connector housing that receives therein the mounting member and the shroud, with the first end of the mounting member projecting beyond an end of the connector housing;
 the exterior sleeve is slideably mounted on an exterior surface of both the mounting member and the connector housing;
 the shroud surrounds at least a portion of the poppet valve and includes an outermost proximal end adjacent the second end of the mounting member, the outermost proximal end having vent openings that provide gas flow between an interior of the shroud and an exterior of the shroud, and the shroud further includes a distal end spaced from the outermost proximal end with a gas flow opening formed in the distal end that provides gas flow between the interior of the shroud and the exterior of the shroud, the poppet valve includes a flow restriction element at an end thereof that projects into the interior of the shroud at the closed position of the poppet valve, the flow restriction element is disposed within the gas flow opening at the distal end of the shroud when the poppet valve is at the open position and at the insertion position, and the outermost proximal end of the shroud abuts the second end of the mounting member and a shoulder of the connector housing so that the shroud is fixed to the mounting member and the connector housing; a first spring is engaged with the exterior sleeve to bias the exterior sleeve towards the first position; and a second spring is engaged with the poppet valve to bias the poppet valve to the closed position.

7. The connector according to claim 6, wherein the mounting member includes an outer circumferential groove that receives a sealing member that forms a seal between an outer surface of the mounting member and an interior surface of the connector housing.

8. The connector according to claim 6, wherein a fluid passageway is defined between an exterior surface of the shroud and an interior surface of the connector housing, and when the flow restriction element is disposed within the gas flow opening at the distal end of the shroud, fluid is forced to flow through the fluid passageway via the vent openings at the proximal end of the shroud.

9. The connector according to claim 6, further comprising an indicator ring connected to the connector housing and at least partially surrounded by the sleeve, wherein the indicator ring is visible when the sleeve is at the first position and the indicator ring is hidden by the sleeve when the sleeve is at the second position.

* * * * *